United States Patent
Lin

(10) Patent No.: US 10,788,895 B2
(45) Date of Patent: Sep. 29, 2020

(54) MEASUREMENT SYSTEM AND MEASUREMENT METHOD USING THE SAME

(71) Applicant: INDUSTRIAL TECHNOLOGY RESEARCH INSTITUTE, Hsinchu (TW)

(72) Inventor: Hsuan-Yu Lin, Changhua (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 16/234,224

(22) Filed: Dec. 27, 2018

(65) Prior Publication Data

US 2020/0183493 A1 Jun. 11, 2020

(30) Foreign Application Priority Data

Dec. 10, 2018 (TW) .............................. 107144365 A

(51) Int. Cl.
G06F 3/01 (2006.01)
G01P 3/02 (2006.01)

(52) U.S. Cl.
CPC ............... *G06F 3/014* (2013.01); *G01P 3/02* (2013.01)

(58) Field of Classification Search
CPC .................................. G06F 3/014; G01P 3/02
See application file for complete search history.

(56) References Cited

U.S. PATENT DOCUMENTS

| 8,098,234 B2 | 1/2012 | Lacroix et al. |
| 8,098,235 B2 | 1/2012 | Heubel et al. |
| 9,501,145 B2 | 11/2016 | Poupyrev et al. |
| 9,874,935 B2 | 1/2018 | Cruz-Hernandez et al. |
| 9,905,063 B1 | 2/2018 | Hyde et al. |

(Continued)

FOREIGN PATENT DOCUMENTS

| CN | 102133143 A | 7/2011 |
| CN | 103052929 A | 4/2013 |

(Continued)

OTHER PUBLICATIONS

Alyssa "Handwritten notes, instant electronic file, MOLESKINE Smart Writing, handwritten notes, quick change, electronic file, show you", https://www.cool3c.com, 2018, 30 pages.

(Continued)

*Primary Examiner* — Andrew Sasinowski
(74) *Attorney, Agent, or Firm* — Birch, Stewart, Kolasch & Birch, LLP

(57) ABSTRACT

A measurement system and a measurement method using the same are provided. Firstly, a measurement system is provided. The measurement system comprises a film, a sensor and a movement information calculator, wherein the film has a patterned structure layer, and the sensor is electrically isolated from and selectively in contact with the film. Then, the sensor directly contacts the patterned structure layer and generates a sensing signal during relative movement process between the sensor and the film. Then, the movement information calculator obtains at least one of a relative movement amount and a relative movement speed during the relative movement process according to the sensing signal.

20 Claims, 11 Drawing Sheets

(56) References Cited

U.S. PATENT DOCUMENTS

| | | | |
|---|---|---|---|
| 2016/0054797 A1* | 2/2016 | Tokubo | G06F 3/041 |
| | | | 345/633 |
| 2016/0342207 A1 | 11/2016 | Beran | |
| 2017/0090568 A1* | 3/2017 | Chen | G06F 3/014 |
| 2017/0255301 A1* | 9/2017 | Norton | B25J 13/02 |
| 2018/0077976 A1* | 3/2018 | Keller | A41D 1/005 |
| 2018/0081438 A1 | 3/2018 | Lehmann et al. | |

FOREIGN PATENT DOCUMENTS

| | | |
|---|---|---|
| CN | 102564649 B | 6/2016 |
| TW | 201537396 A | 10/2015 |
| TW | I524222 B | 3/2016 |
| TW | 201821943 A | 6/2018 |
| TW | 201822856 A | 7/2018 |

OTHER PUBLICATIONS

Fishel et al., "A robust micro-vibration sensor for biomimetic fingertips", Biomedical Robotics and Biomechatronics, 2008, 6 pages.

Gomez Eguiluz et al., "Multimodal Material identification through recursive tactile sensing", Robotics and Autonomous Systems, vol. 106, 2018, pp. 130-139.

Plantech International, "LCD Optical Transmission Films", https://www.planetechn.com/Lightguides/LCD_Enhancement_Films.html, 2009, 2 pages.

Su et al., "Design of Tactile Sensor Array on Electric Gripper Jaws for Wire Gripping Recognition", 2014 IEEE International Conference on Automation Science and Engineering (CASE), Taipei, Taiwan, Aug. 18-22, 2014, pp. 1014-1019.

Taiwanese Office Action and Search Report, dated Nov. 13, 2019, for Taiwanese Application No. 107144365.

* cited by examiner

MEASUREMENT SYSTEM AND MEASUREMENT METHOD USING THE SAME

This application claims the benefit of Taiwan application Serial No. 107144365, filed Dec. 10, 2018, the disclosure of which is incorporated by reference herein in its entirety.

TECHNICAL FIELD

This disclosure relates to a measurement system and a measurement method using the same.

BACKGROUND

Conventional augmented reality (AR) devices are typically worn on the user's head and used to project a projected image. When the user virtually touches the projected image by hand, the AR device transmits signal to an external server. The external server performs related operations based on the signal and feeds back to the AR device. However, such approach increases the burden on the external server and causes a delay in feedback between signal transmissions. Therefore, it is an effort direction for the industry to propose a new system to improve the aforementioned problems.

SUMMARY

According to one embodiment of this disclosure, a measurement system is provided. The measurement system includes a film, a sensor and a movement information calculator. The film has a patterned structure layer. The sensor is configured to contact the patterned structure layer and generate a sensing signal during a relative movement process of the sensor and the film, wherein the sensor is electrically isolated from and selectively contacts the film. The movement information calculator is configured to obtain at least one of a relative movement amount and a relative movement speed in the relative movement process according to the sensing signal.

According to another embodiment of this disclosure, a measurement method is provided. The measurement method includes the following steps. A measurement system is provided, wherein the measurement system includes a film, a sensor and a movement information calculator, the film has a patterned structure layer, and the sensor is electrically isolated from and selectively contacts the film; the patterned structure layer is contacted by the sensor and a sensing signal is generated by the sensor during relative movement process of the sensor and the film; and at least one of a relative movement amount and a relative movement speed is obtained by the movement information calculator in the relative movement process according to the sensing signal.

The above and other aspects of this disclosure will become better understood with regard to the following detailed description of the preferred but non-limiting embodiments. The following description is made with reference to the accompanying drawings.

Figure 1A:
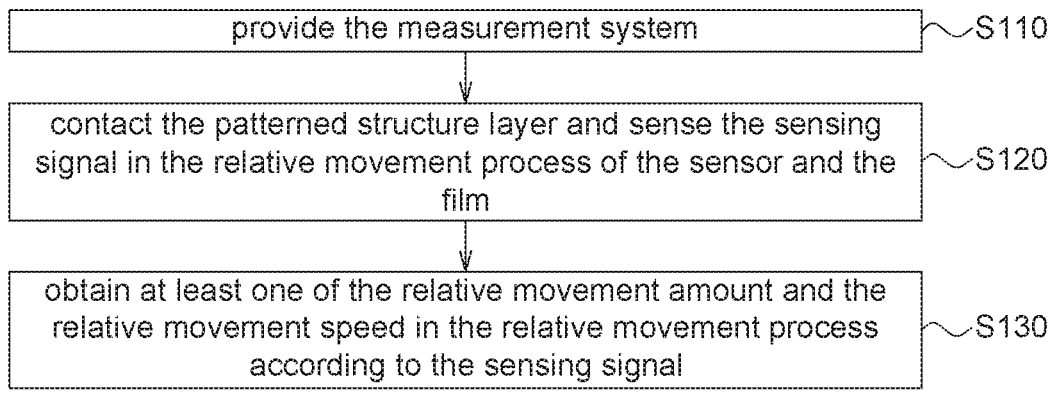
FIG. 1A is a flow chart of a measurement method according to an embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Figure 1B:
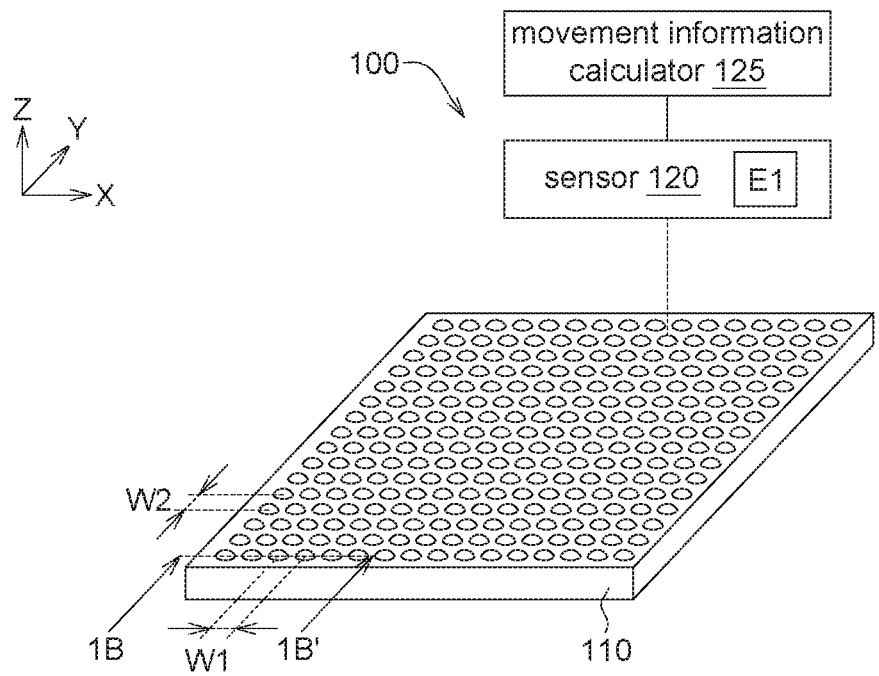
FIG. 1B is a functional block diagram of a measurement system according to an embodiment of the present disclosure.
Figure 1C:
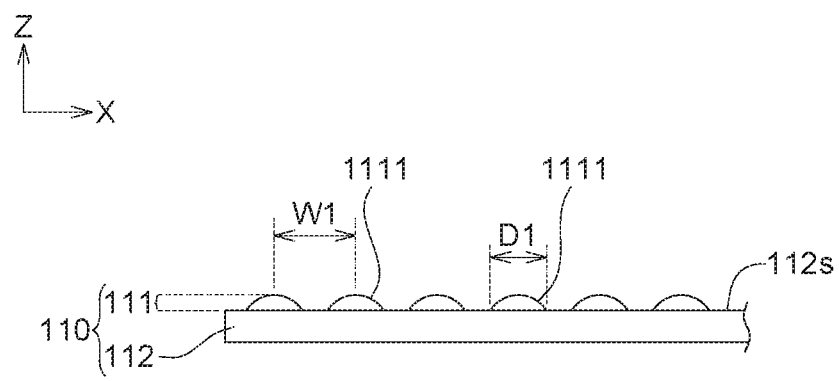
FIG. 1C is a cross-sectional view of the film of FIG. 1B along the direction 1B-1B'.
Figure 1D:
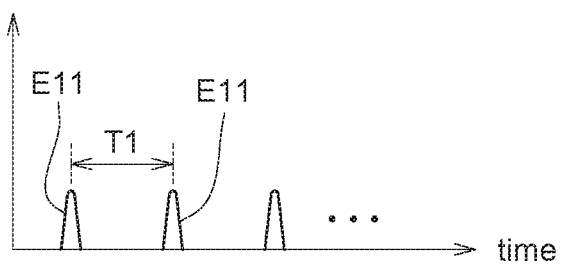
FIG. 1D is a schematic diagram of sensing signal generated by the sensor of FIG. 1B.

Referring to FIG. 1A to FIG. 1D, FIG. 1A is a flow chart of a measurement method according to an embodiment of the present disclosure, FIG. 1B is a functional block diagram of a measurement system 100 according to an embodiment of the present disclosure, FIG. 1C is a cross-sectional view of the film 110 of FIG. 1B along the direction 1B-1B', and FIG. 1D is a schematic diagram of sensing signal E1 generated by the sensor 120 of FIG. 1B.

In step S110, as shown in FIGS. 1B and 1C, a measurement system 100 is provided. The measurement system 100 includes a film 110, a sensor 120 and a movement information calculator 125. The film 110 has a patterned structure layer 111. The sensor 120 and/or the movement information calculator 125 may be a circuit structure formed by a semiconductor process. In one embodiment, the sensor 120 and the movement information calculator 125 could be integrated into a single component, such as a sensing chip or a semiconductor sensing package, through a semiconductor process.

As shown in FIG. 1B, the film 110 includes the patterned structure layer 111 and a substrate 112. The patterned structure layer 111 is formed on the surface 112s of the substrate 112. The XY plane shown in FIG. 1B is the plane of extension of the surface 112s. In one embodiment, the patterned structure layer 111 is integrally formed with the substrate 112. In another embodiment, the patterned structure layer 111 and the substrate 112 may be a non-integral formed structure. For example, after the substrate 112 is formed, the patterned structure layer 111 is formed on the substrate 112 using different processes. In addition, the substrate 112 has flexibility such that the patterned structure layer 111 is disposed, with the substrate 112, on a non-planar surface of object, such as a cylindrical surface, a spherical surface, an elliptical surface, or the like. In terms of material, the substrate 112 may be made of, for example, glass, plastic, rubber, a material containing a silicon (Si) or silicon compound, a material containing a metal or a metal compound, a material containing an organic substance, and the like, and the patterned structure layer 111 is, for example, a plastic, glass, rubber, a material containing silicon or silicon compound, a material containing metal or metal compound, a material containing organic matter, and the like. In addition, the substrate 112 and the patterned structure layer 111 may be a transparent material or a non-transparent material. Alternatively, the film 110 could be made of a compressible material such as a rubber material or a cloth.

As shown in FIGS. 1B and 1C, the patterned structure layer 111 includes a plurality of microstructures 1111 that are protrudingly disposed or connected to the substrate 112 with respect to the surface 112s. In an embodiment, the microstructure 1111 is, for example, at least a portion of a polyhedron, such as at least a portion of a sphere, at least a portion of an ellipsoid, or at least a portion of a cylinder. The embodiment of the present disclosure does not limit the geometry of the microstructure 1111. In the present embodiment, all microstructures 1111 have the same geometric shape, such as at least a portion of a sphere. Furthermore, an outer diameter D1 of the microstructure 1111 is, for example, between about 0.02 millimeters (mm) and about 2 mm, and an interval W1 between adjacent two microstructures 1111 is, for example, between about 0.02 mm and about 5 mm.

As shown in FIGS. 1B and 1C, in the present embodiment, the patterned structure layer 111 has a periodic structure. In detail, a number of microstructures 1111 are arranged in a regular manner. For example, a number of microstructures 1111 are arranged in an array in the X and Y directions. As shown in the figure, there is an interval W1 between adjacent two microstructures 1111 arranged in the X direction, and there is an interval W2 between adjacent two microstructures 1111 arranged in the Y direction, wherein the interval W1 and the interval W2 are substantially equal, or different.

In step S120, the sensor 120 may directly or indirectly contact the patterned structure layer 111, and senses a sensing signal E1 during the relative movement process of the sensor 120 and the film 110. The film 110 is electrically isolated from and selectively contacts the sensor 120. In detail, the sensor 120 contacts the film 110 when the measurement system 100 is to be used. If the measurement system 100 is not used, the sensor 120 and the film 110 could be placed separately or stacked to each other. In addition, the sensor 120 generates the sensing signal E1 by contacting the film 110, and the sensor 120 and the film 110 are not electrically connected to each other.

In the present embodiment, the relative movement of the sensor 120 and the film 110 occurs, for example, in a direction substantially parallel to the surface 112s. The relative movement process here is, for example, that one of the sensor 120 and the film 110 does not move while the other of the sensor 120 and the film 110 moves relatively. As shown in FIG. 1D, the sensing signal E1 includes a number of impulses E11. During the relative movement process, the impulses E11 are generated when the sensor 120 contacts the microstructures 1111. The impulses E11 are not generated when the sensor 120 does not contact the microstructures 1111. As a result, a time difference T1 of the adjacent two impulses E11 shown in FIG. 1D represents the time required for the sensor 120 to pass the interval between the adjacent two microstructures 1111. In the present embodiment, the film 110 may be made of a material having low compressibility such as glass.

In step S130, the movement information calculator 125 obtains at least one of the relative movement amount S1 and the relative movement speed V1 in the relative movement process according to the sensing signal E1. For example, the movement information calculator 125 could calculate the relative movement speed V1 by a calculation formula: V1=W1/T1, wherein the parameter W1 represents the interval between adjacent two microstructures 1111, such as the interval W1 or W2. In addition, the relative movement amount S1 is related to the number of the impulses E11. When the number of the sensed impulses E11 is more, it represents that the more the microstructures 1111 that the sensor 120 passes, the larger the relative movement amount S1. In the present embodiment, since the microstructures 1111 are regularly arranged, the calculation formula of the relative movement amount S1 could be simplified as S1=W× N, where N is the number of the intervals of the impulses E11 (the more the number of the intervals is, the larger the relative movement amount S1 is).

In the present embodiment, due to the microstructures 1111 being regularly arranged in the X and Y directions, for example, the interval W1 is equal to the interval W2. Regardless of the movement of the sensor 120 in the X direction or the Y direction, the calculation formula of the relative movement amount S1 is: S1=W×N, where N is the number of the intervals of the impulses E11 (the more the number of the intervals is, the larger the relative movement amount S1 is), and the calculation formula of the relative movement speed V1 is also: V1=W/T1.

In summary, due to the microstructures 1111 being regularly arranged, for example, the interval between adjacent two microstructures 1111 is substantially equal, the measurement system could quickly obtain the relative movement amount S1 and the relative movement speed V1 without complicated algorithms.

In an embodiment, the sensor 120 is composed, for example, of a number of sensing units, wherein the sensing units are arranged in an array. When the sensor 120 moves relative to the patterned structure layer 111, different sensing units could sense different sensing signals, whereby the movement information calculator 125 could analyze the two-dimensional motion mode of the sensor 120 for determining the moving path (moving direction) of the sensor 120. In another embodiment, the measurement system 100 includes a number of sensors 120 to achieve similar or identical technical result. As a result, even if the plurality of microstructures 1111 are irregularly distributed, the moving path (moving direction) of the sensor 120 could be obtained through the two-dimensional motion mode, and at least one of the relative movement amount and the relative movement speed of the sensor 120 could be obtained by calculation.

Figure 2A:
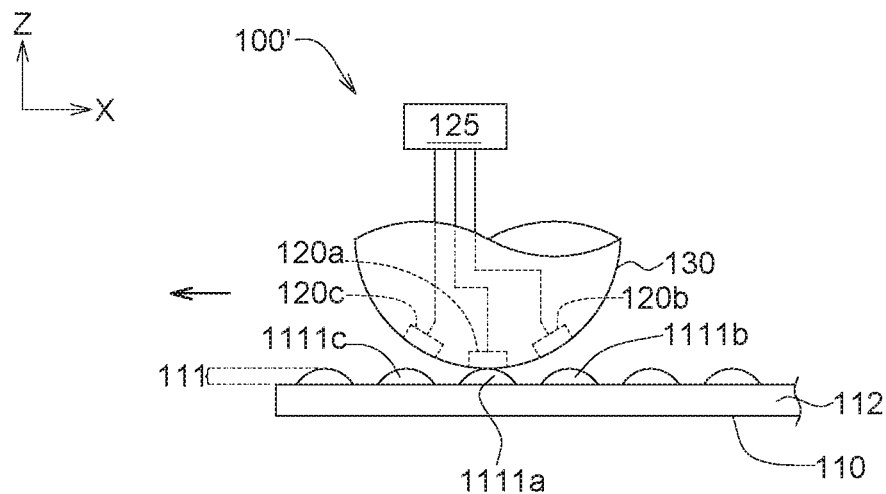
FIG. 2A is a schematic diagram showing the sensor of the measurement system contacting the patterned structure layer according to another embodiment of the present disclosure.
Figure 2B:
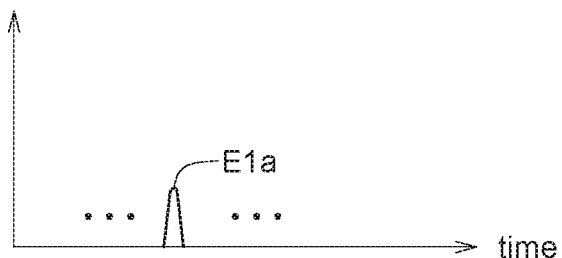
FIG. 2B is a schematic diagram of the sensing signal of the sensor of FIG. 2A.
Figure 2C:
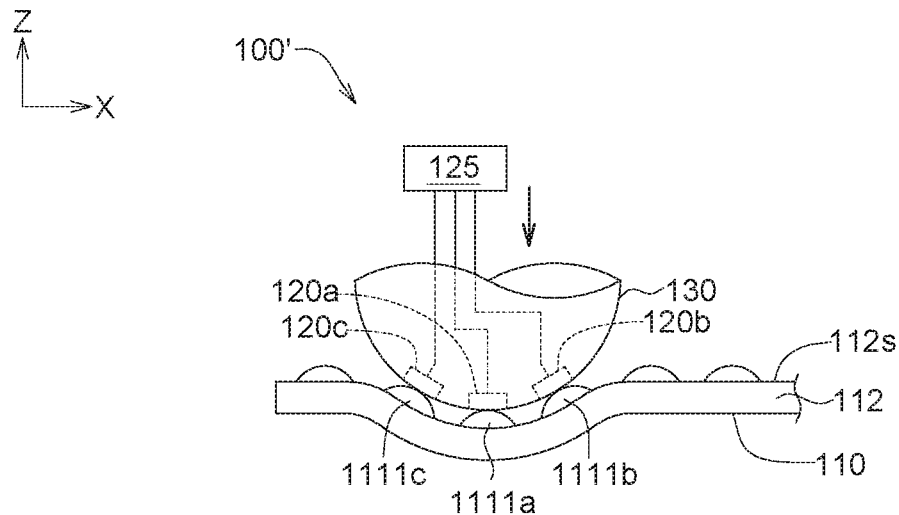
FIG. 2C is a schematic diagram of the sensors of FIG. 2A pressing the patterned structure layer.
Figure 2D:
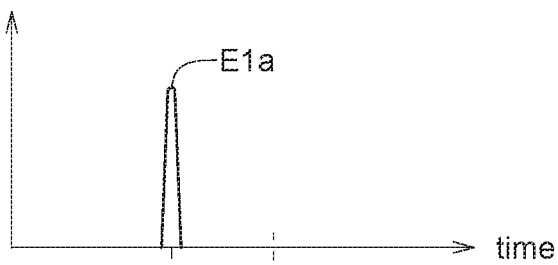
FIG. 2D is a schematic diagram of the sensing signal of the sensors of FIG. 2C.
Figure 2D:
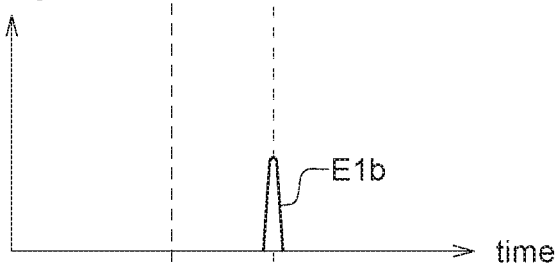
Figure 2D:
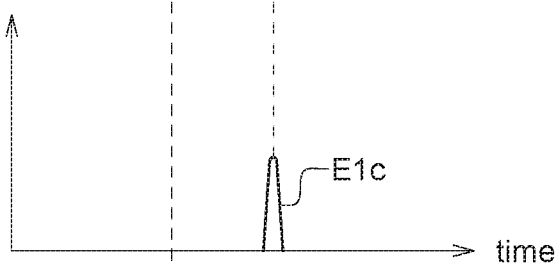

Referring to FIG. 2A to FIG. 2D, FIG. 2A is a schematic diagram showing the sensor 120a of the measurement system 100' contacting the patterned structure layer 111 according to another embodiment of the present disclosure, FIG. 2B is a schematic diagram of the sensing signal E1 of the sensor 120a of FIG. 2A, FIG. 2C is a schematic diagram of the sensors 120a-120c of FIG. 2A pressing the patterned structure layer 111, and FIG. 2D is a schematic diagram of the sensing signal E1 of the sensors 120a-120c of FIG. 2C.

As shown in FIG. 2A, a number of sensors 120a to 120c and the movement information calculator 125 are disposed in a carrier 130. The sensors 120a-120c move with the carrier 130. Embodiments of the present disclosure do not limit the manner in which the carrier 130 moves. The carrier 130 could move relative to the film 110 in a parallel direction (e.g., in the X direction) and/or in a vertical direction (e.g., in the Z direction).

In step S120 of the present embodiment, as shown in FIG. 2A, the relative movement of the sensors 120a-120c and the film 110 is, for example, in a parallel direction (e.g., in the X direction), due to only the sensor 120a being in contact with the microstructures 1111a of the film 110, so that only the sensing signal E1 of the sensor 120a has an impulse E1a, as shown in FIG. 2B.

In another aspect of the present embodiment, as shown in FIG. 2C, the relative movement of the sensors 120a-120c and the film 110 occurs, for example, in a vertical direction, wherein the vertical direction is, for example, a direction substantially perpendicular to the surface 112s, such as the direction Z of FIG. 2C. In the present example, the film 110 may be made of a compressible material such as the aforementioned rubber material or cloth. Since the film 110 could provide a deformable amount, the sensor 120 emits the sensing signal E1 according to the different deformation amount in the film 110 being pressed during the relative movement process. For example, as shown in FIG. 2C, the sensor 120a first contacts the microstructure 1111a and is pressed down with the carrier 130, such that the sensors 120b and 120c to contact the microstructures 1111b and 1111c, respectively. As shown in FIG. 2D, since the sensor 120a is pressed earlier than the sensors 120b and 120c, the impulse E1a of the sensing signal E1 occurs earlier than the impulse E1b of the sensing signal E1 of the sensor 120b and the impulse E1c of the sensing signal E1 of the sensor 120c. Moreover, in another situation, since the applied pressure of the sensor 120a is greater than the applied pressure of the sensors 120b and 120c, the intensity of the impulse E1a of the sensing signal E1 is greater than that of the sensors 120b and 120c. Furthermore, compared with the intensity of the impulse E1a of FIG. 2B sensed by the slightly touch, the intensity of the impulse E1a of FIG. 2D sensed by pressing is greater. In another embodiment, depending on the actual pressing condition, the applied pressure of the sensor 120a may be smaller than the applied pressure of the sensors 120b and 120c, so that the intensity of the impulse E1a of the sensing signal E1 is also smaller than the intensity of the impulse E1b of the sensor 120b and the intensity of the impulse E1c of the sensor 120c.

In summary, the movement information calculator 125 could determine the motion mode of the carrier 130 according to the occurrence time, the number, and/or the intensity of the impulse of each sensing signal E1, for example, the motion mode along horizontal direction, vertical direction, or simultaneously moving along horizontally direction and vertical direction, for example, a moving direction which may be composed into the horizontally direction and the vertical direction.

In step S130 of the present embodiment, the movement information calculator 125 obtains at least one of the relative movement amount S1 and the relative movement speed V1 in the relative movement process (e.g., in the vertical direction) according to the sensing signal E1.

In step S120 of another embodiment, the relative movement of the sensor 120 and the film 110 occurs, for example, in an oblique direction, wherein the oblique direction is decomposed into the aforementioned direction parallel to the surface 112s and the aforementioned vertical direction. In the present example, the film 110 may be made of a compressible material such as the aforementioned rubber material or cloth. Since the film 110 could provide a deformable amount, the sensor 120 emits sensing signal E1 according to the different deformation amount occurring in the pressing of the film 110 (for example, pressed in the vertical direction) and the movement situation along the surface 112s. In step S130, the movement information calculator 125 obtains at least one of the relative movement amount S1 and the relative movement speed V1 during the relative movement process (e.g., in the vertical direction and along the surface 112s) according to the sensing signal E1. In this example, the film 110 could be made of a compressible material.

The application of the film 110 and the sensor 120 will be described below.

Figure 3A:
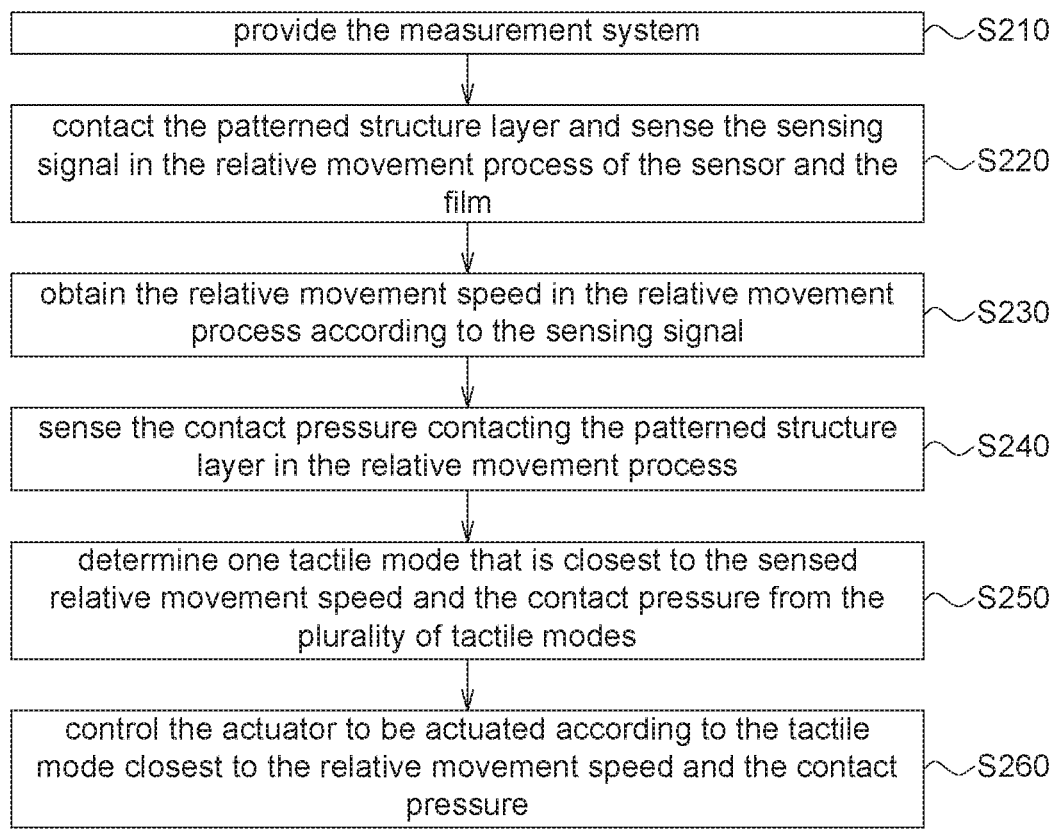
FIG. 3A is a flow chart of a measurement method according to another embodiment of the present disclosure.
Figure 3B:
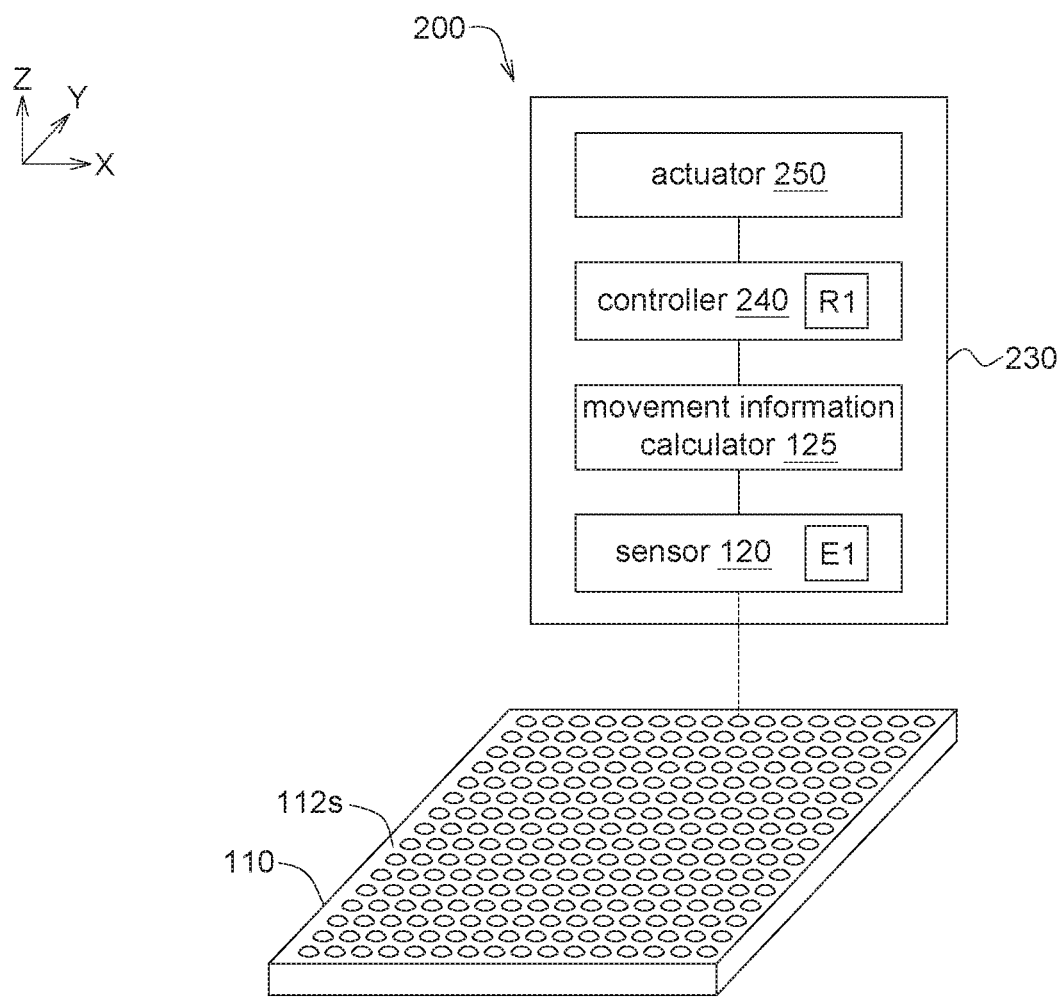
FIG. 3B is a functional block of the measurement system according to an embodiment of the present disclosure.
Figure 3C:
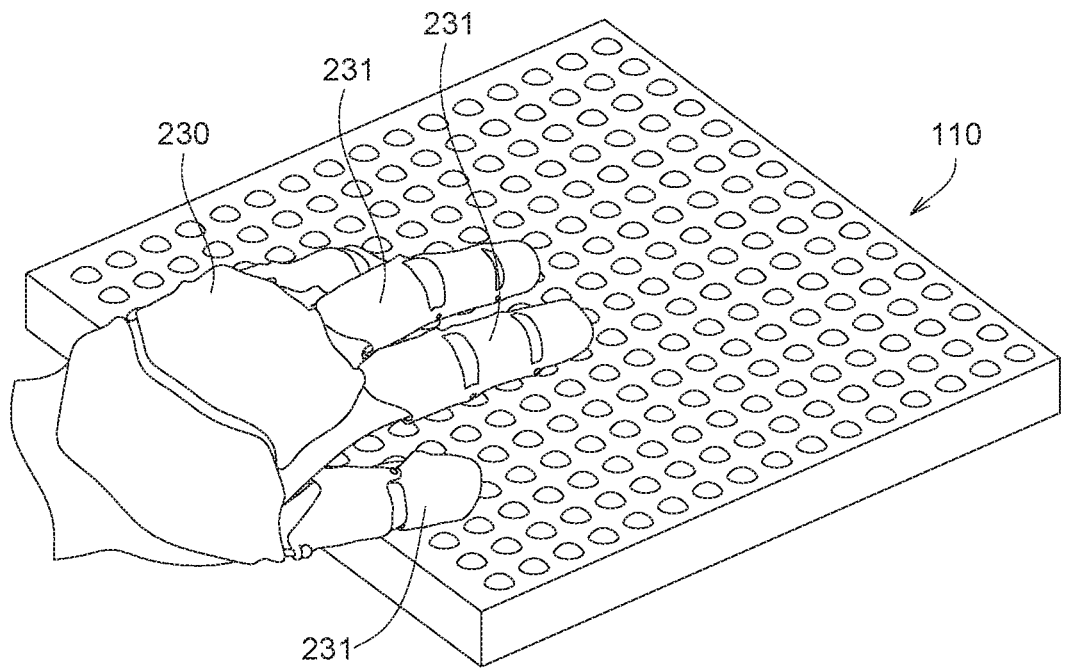
FIG. 3C and FIG. 3D are schematic diagrams showing the user contacting the film with the glove in the present embodiment.
Figure 3D:
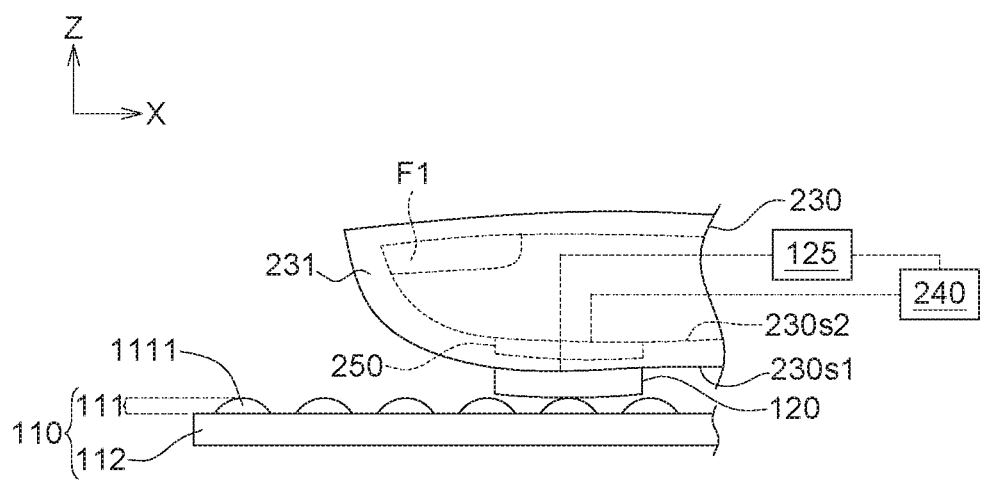

Referring to FIGS. 3A-3D, FIG. 3A is a flow chart of a measurement method according to another embodiment of the present disclosure, and FIG. 3B is a functional block of the measurement system 200 according to an embodiment of the present disclosure, and FIG. 3C and FIG. 3D are schematic diagrams showing the user contacting (or touching) the film 110 with the glove 230 in the present embodiment.

In step S210, as shown in FIG. 3B, the measurement system 200 is provided. The measurement system 200 includes the film 110 and a glove product, wherein the glove product includes at least one sensor 120, the movement information calculator 125, a glove 230, a controller 240, and at least one actuator 250, wherein the sensor 120, the movement information calculator 125, the controller 240 and the actuator 250 may be disposed in the glove 230. In the present embodiment, at least two of the sensor 120, the movement information calculator 125, the controller 240 and the actuator 250 are connected by at least one physical trace, so that the signal could be transmitted quickly. In an embodiment, the sensor 120, the movement information calculator 125 and/or the controller 240 may be a circuit structure formed by a semiconductor process. In one embodiment, at least two of the sensor 120, the movement information calculator 125 and the controller 240 could be integrated into a single component, such as a semiconductor chip or semiconductor package, through at least one semiconductor process.

In an embodiment, the sensor 120, the movement information calculator 125, the controller 240, the actuator 250 and the glove 230 may constitute an Augmented Reality (AR) device. In addition, the glove 230 may be adapted to the field of application and replaced with a carrier of another type or geometry.

The sensor 120 could be disposed on a finger portion 231 of the glove 230. The sensor 120 may be exposed from the glove 230 to sense the patterned structure layer 111 of the film 110. For example, as shown in FIG. 3D, the sensor 120 may be disposed on an outer surface 230s1 of the glove 230 to directly contact the patterned structure layer 111 of the film 110. In the present embodiment, the sensor 120 is a pressure sensor, so that the sensor 120 could sense the contact pressure of the contact patterned structure layer 111.

The controller 240 is disposed in the glove 230 and electrically connected to the sensor 120, the movement information calculator 125 and the actuator 250. In the present embodiment, the controller 240 could control the actuation mode of the actuator 250 according to the sensing signal E1 sensed by the sensor 120.

The actuator 250 may be disposed on the finger portion 231 of the glove 230, and the finger portion 231 is, for example, a cover sleeve for the thumb, forefinger, middle finger, ring finger or little finger. The actuator 250 could be disposed on the inside of the glove 230 such that the finger F1 could sense the actuation of the actuator 250. For example, the actuator 250 is exposed from the inner surface 230s2 of the glove 230 (the inner surface 230s2 is shown in FIG. 3D) to contact the users finger F1 causing the finger F1 to sense the actuation of the actuator 250. The finger F1 is, for example, a thumb, a forefinger finger, a middle finger, a ring finger or a little finger. In an embodiment, the actuator 250 is, for example, a vibrator.

In step S220, in the present embodiment, the patterned structure layer 111 is stationary with respect to the glove 230, and the glove 230 may directly or indirectly contact the patterned structure layer 111 and move over the patterned structure layer 111. In the relative movement process, the sensor 120 generates a sensing signal E1 similar to that shown in FIG. 1D. In the present embodiment, the relative movement of the sensor 120 and the film 110 (shown in FIG. 3B) occurs, for example, in a direction substantially parallel to the surface 112s.

In step S230, the movement information calculator 125 uses the foregoing method (step S130) to obtain the relative movement speed V1 in the relative movement process according to the sensing signal E1.

In step S240, the sensor 120 senses the contact pressure P1 of contacting the patterned structure layer 111 in the relative movement process. For example, the amplitude of the impulse E11 of the sensing signal E1 sensed by the sensor 120 indicates the magnitude of the contact pressure P1. The larger the amplitude of the impulse E11, the larger the contact pressure P1. The smaller the amplitude of the impulse E11, the smaller the contact pressure P1.

Then, in step S250, the controller 240 determines one tactile mode R1 that is closest to the sensed relative movement speed V1 and the contact pressure P1 from the plurality of tactile modes R1. The tactile mode R1 is, for example, a material tactile mode in a specific situation, for example, a tactile perception corresponding to the relative movement speed V1 and the contact pressure P1 in the situation of wood material. In addition to the wood material situations, the aforementioned specific situation may also be other various material situation, such as a metal material situation, a plastic material situation, a cloth material situation, a food material situation, and the like. In addition, the tactile mode R1 could be obtained in advance by experiments, simulations, and the like, and then stored in the controller 240 or another memory (not shown). In an embodiment, the aforementioned specific situation may be provided, for example, by an external server. For example, before the contact, let the measurement system know that the virtual touch object is wood (for example, through the user interface input or determined by the system itself), and then the corresponding data is provided by the external server.

Further, in an embodiment, the setting for the situation may be performed by an external server (not shown). For example, the external server notifies the controller 240 of the situation setting response to the user's setting command of a situation setting. Then, the controller 240 controls the actuator 250 to be actuated according to the relative movement speed V1 and the contact pressure P1 under the situation setting.

In step S260, the controller 240 controls the actuator 250 to be actuated (e.g., the actuator 250 generates vibration or the actuator 250 vibrates) according to the tactile mode R1 closest to the relative movement speed V1 and the contact pressure P1. Through the actuation of the actuator 250, the tactile perception of the finger F1 could be close to the tactile mode R1.

The measurement method in another embodiment could simulate the degree of softness and hardness of the material, and the following is exemplified by steps S210 to S260 of FIG. 3A. Step S210 is similar to the foregoing description, and details are not repeated herein again. In step S220, the relative movement of the sensor 120 and the film 110 occurs, for example, in a vertical direction, wherein the vertical direction is, for example, a direction substantially perpendicular to the surface 112s, such as the direction Z of FIG. 3B. In the present example, since the film 110 could provide a deformable amount, the sensor 120 generates the sensing signal E1 according to the different deformation amount of the film 110 in the relative movement process. In step S230, the movement information calculator 125 obtains the relative movement speed V1 in the relative movement process (in the vertical direction) according to the sensing signal E1. In step S240, the sensor 120 senses the contact pressure P1 generated by contacting patterned structure layer 111. In step S250, the controller 240 determines one tactile mode that is closest to the sensed relative movement speed V1 and the contact pressure P1 from the plurality of tactile modes. The tactile mode in the present embodiment is, for example, a material pressure mode in a specific situation, such as change of material property in soft and hard (or degree of material stiffness). In addition, the tactile mode in the present embodiment could be obtained in advance by using an experiment, a simulation, or the like, and then stored in the controller 240 or another memory (not shown). In step S260, the controller 240 controls the actuator 250 to be actuated (e.g., the actuator 250 generates vibration or the actuator 250 vibrates) according to the tactile mode that is closest to the relative movement speed V1 and the contact pressure P1. Through the actuation of the actuator 250, the tactile mode of the finger F1 could be close to the tactile mode.

In other embodiments, the measurement method may also omit steps S220 and S230, so that the tactile mode could be determined without considering the relative movement speed V1. For example, in step S250, the controller 240 determines one tactile mode that is closest to the sensed contact pressure P1 from the plurality of tactile modes, and in step S260, the controller 240 controls the actuator 250 to be is actuated (e.g., the actuator 250 generates vibration or the actuator 250 vibrates) only according to the tactile mode the closest to the contact pressure P1.

Figure 4A:
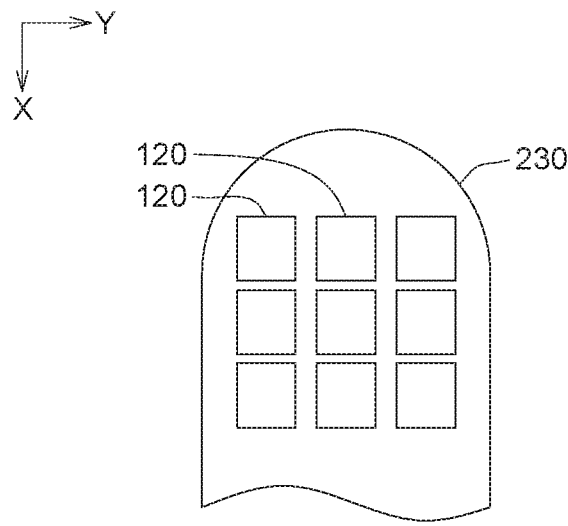
FIG. 4A is a schematic diagram showing another configuration of the sensor of FIG. 3D.
Figure 4B:
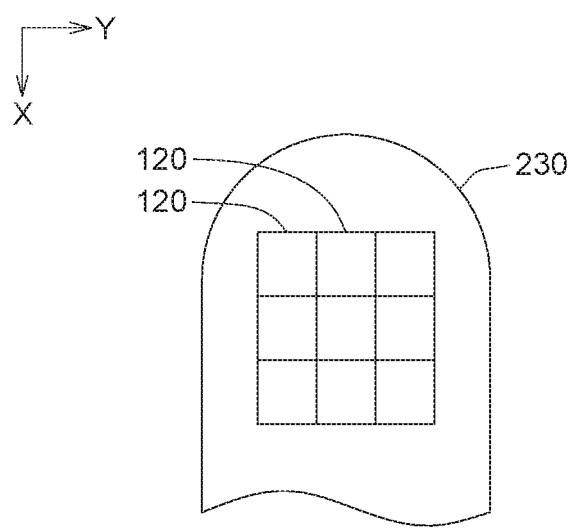
FIG. 4B is a schematic diagram showing still another configuration of the sensor of FIG. 3D.

Referring to FIGS. 4A and 4B, FIG. 4A is a schematic diagram showing another configuration of the sensor 120 of FIG. 3D, and FIG. 4B is a schematic diagram showing still another configuration of the sensor 120 of FIG. 3D. As shown in FIG. 4A, a number of the sensors 120 are arranged in an array and separated from each other. As shown in FIG. 4B, a number of the sensors 120 are arranged in an array and connected to each other, that is, the plurality of sensors 120 constitute a continuous sensing surface. The glove 230 in the present embodiment of the present disclosure could move along the vertical direction and/or the parallel direction. According to the movement of the glove 230, the sensing signals E1 sensed by several sensors 120 disposed on the glove 230 are similar to the sensing signals of FIGS. 2A to 2D, and the manner of processing the sensing signals is similar to that of the FIGS. 2A-2D drawings, and will not be described herein.

In addition, in the measurement method of another embodiment, step S210 is similar to the foregoing description, and details are not repeated herein again. In step S220, the relative movement of the sensor 120 and the film 110 occurs, for example, in an oblique direction, wherein the oblique direction is decomposed into the aforementioned direction parallel to the surface 112s and the aforementioned vertical direction. In the relative movement process, the sensor 120 emits the sensing signal E1 according to the different deformation amount occurring in the pressing of the film 110 (for example, pressed in the vertical direction) and the movement situation along the surface 112s, In step S230, the movement information calculator 125 obtains the relative movement speed V1 in the relative movement process (e.g., along the surface 112s) according to the sensing signal E1. In step S240, the sensor 120 senses the contact pressure P1 generated by contacting patterned structure layer 111 (e.g., in the vertical direction). In step S250, the controller 240 determines one tactile mode that is closest to the sensed relative movement speed V1 and the contact pressure P1 from the tactile modes. The tactile mode in the present embodiment is, for example, a material pressure mode in a specific situation, such as change of material property in soft and hard (or degree of material stiffness). In addition, the tactile mode in the present embodiment could be obtained in advance by using an experiment, a simulation, or the like, and then stored in the controller 240 or another memory (not shown). In step S260, the controller 240 controls the actuator 250 to be actuated (e.g., the actuator 250 generates vibration or the actuator 250 vibrates) according to the tactile mode that is closest to the relative movement speed V1 and the contact pressure P1. Through the actuation of the actuator 250, the tactile mode of the finger F1 could be close to the tactile mode. In this example, the film 110 may be made of a compressible material.

In summary, the user could feel different kinds of tactile modes in several different tactile situations under the circumstances of only touching one film 110. In addition, since the plurality of microstructures 1111 are regularly arranged, for example, the interval between adjacent two microstructures 1111 is substantially equal, the measurement system could quickly obtain the relative movement speed V1 and the contact pressure P1 without complicated algorithms. As a result, as soon as the sensor 120 contacts the patterned structure layer 111, the actuator 250 could quickly generate a corresponding actuation, making the finger sense the corresponding tactile mode in real time. In addition, the controller 240, the sensor 120, the movement information calculator 125 and the actuator 250 in the present embodiment of the present disclosure are all disposed in the glove 230, such that the signal transmission path among the controller 240, the sensor 120, the movement information calculator 125 and the actuators 250 is short and the transmission speed is fast. Accordingly, the fingers could sense the corresponding tactile mode more quickly. Since the controller 240, the sensor 120, the movement information calculator 125 and the actuator 250 are disposed in the same carrier (for example, the glove 230), the glove 230 including these components could independently complete the foregoing steps S210 to S260, and it will not Increase the extra burden on the external server.

In addition, the foregoing embodiment is described by taking one sensor 120 and one actuator 250 as an example. However, in other embodiments, the sensor 120 and the actuator 250 may be plural. The number of the finger portions 231 of the glove 230 is plural, and each of the finger portions 231 may be configured with at least one sensor 120 and at least one actuator 250. As a result, each finger F1 could sense the corresponding tactile mode R1. The tactile mode R1 virtually touched by each finger F1 (that is, the finger F1 feels the vibration generated by the actuator 250 based on the tactile mode R1) depends on the contact pressure P1 of the finger and the relative movement speed V1, and is not always the same. In another embodiment, the glove 230 may include a palm portion (not shown), and the palm portion may be configured with at least one sensor 120 and at least one actuator 250. As a result, the palm of the user could also sense the corresponding tactile mode R1 according to the same or similar principles as described above.

Figure 5A:
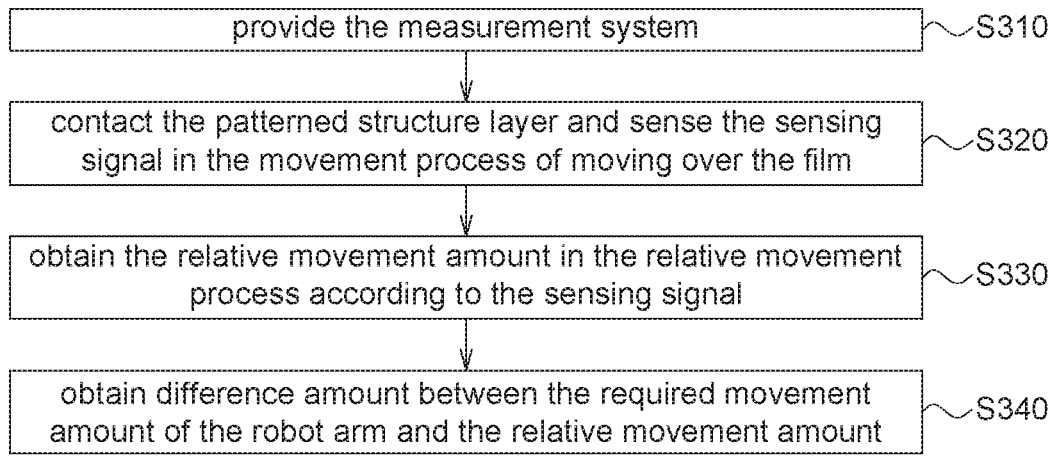
FIG. 5A is a flow chart of a measurement method according to another embodiment of the present disclosure.
Figure 5B:
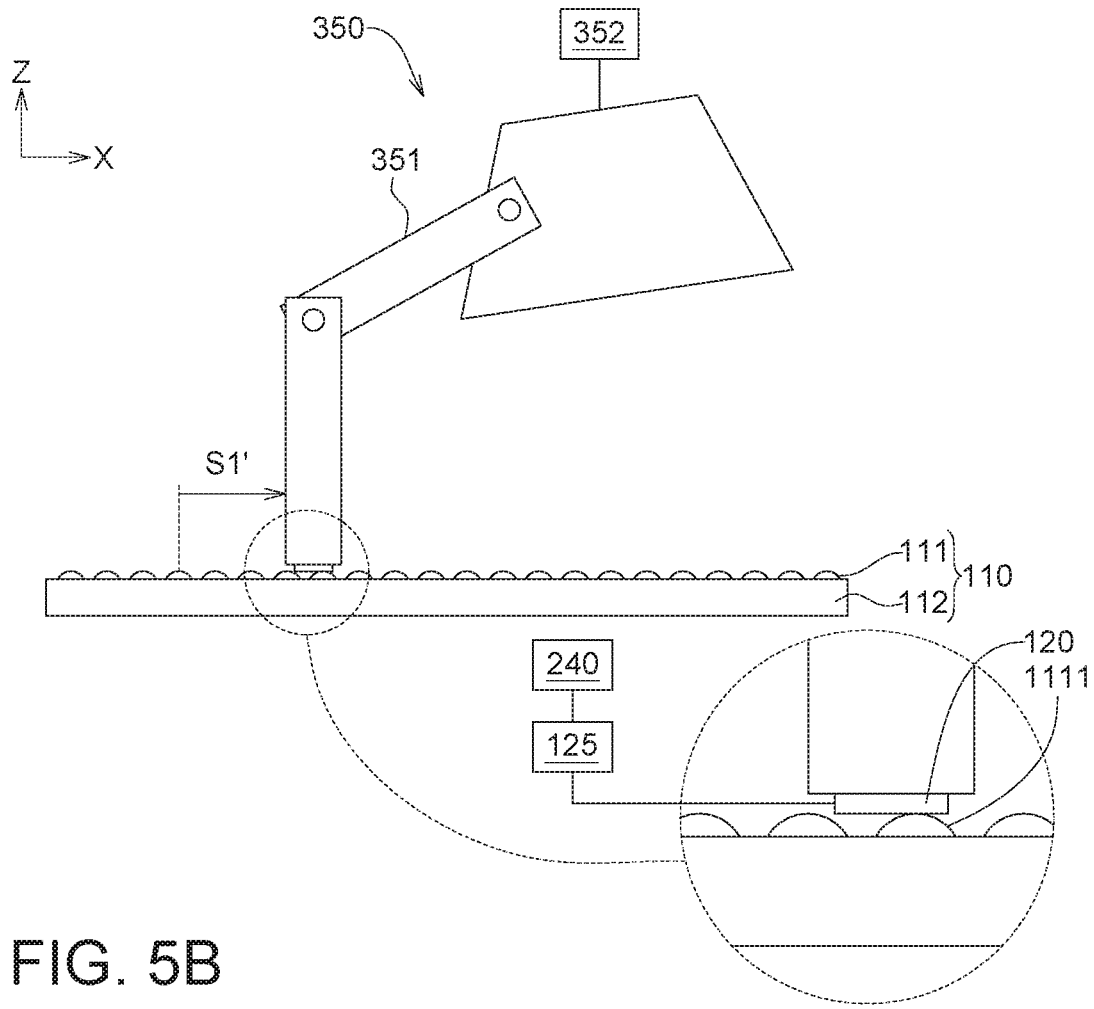
FIG. 5B is a schematic diagram showing a measurement system according to another embodiment of the present disclosure.

FIGS. 5A and 5B, FIG. 5A is a flow chart of a measurement method according to another embodiment of the present disclosure, and FIG. 5B is a schematic diagram showing a measurement system 300 according to another embodiment of the present disclosure.

In step S310, the measurement system 300 is provided. The measurement system 300 includes the film 110, at least one sensor 120, the movement information calculator 125, the controller 240 and the robotic arm module 350. The robot arm module 350 includes a robot arm 351 and a controller 352, wherein the controller 352 is configured to control the robot arm 351 to move. The sensor 120 could be disposed on the robot arm 351 and electrically connected to the movement information calculator 125 and the controller 240. In an embodiment, the sensor 120, the movement information calculator 125 and the controller 240 may constitute a measurement device.

Then, in step S320, the controller 352 controls the robot arm 351 to move along a driving axial direction over the patterned structure layer 111 by a required movement amount S1'. In the movement process, the sensor 120 contacts the patterned structure layer 111 and senses the sensing signal similar to the sensing signal E1 of FIG. 1D.

Then, in step S330, the movement information calculator 125 uses the aforementioned method (step S130) and obtains the relative movement amount S1 in the relative movement process (the actual movement amount of the robot arm 351) according to the sensing signal E1.

Then, in step S340, the controller 240 obtains difference amount between the required movement amount of the robot arm 351 and the relative movement amount S1. When the difference amount is larger, it indicates that a displacement control accuracy of the robot arm 351 along the driving axial direction is worse; the reverse is better. As a result, the displacement of the robot arm 351 could be corrected according to the obtained displacement control accuracy.

In another embodiment, steps S310 to S340 may be employed to obtain the displacement control accuracy of the robot arm 351 along another driving axial direction. According to the foregoing method, the displacement control accuracy of all the driving axial directions of the robot arm 351 could be obtained.

Figure 6A:
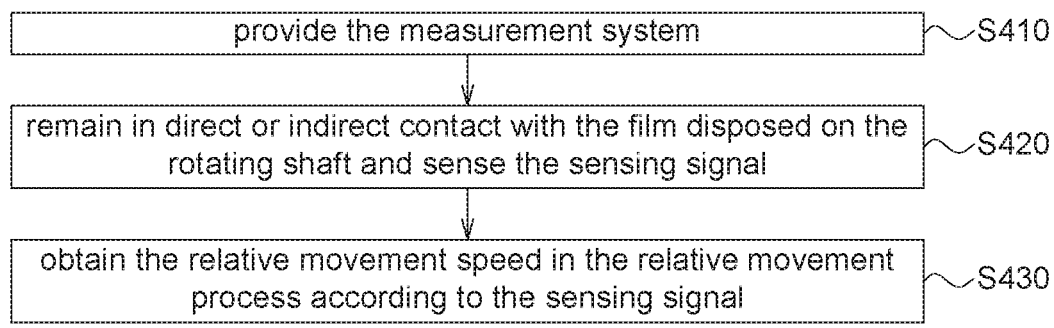
FIG. 6A is a flow chart of a measurement method according to another embodiment of the present disclosure.
Figure 6B:
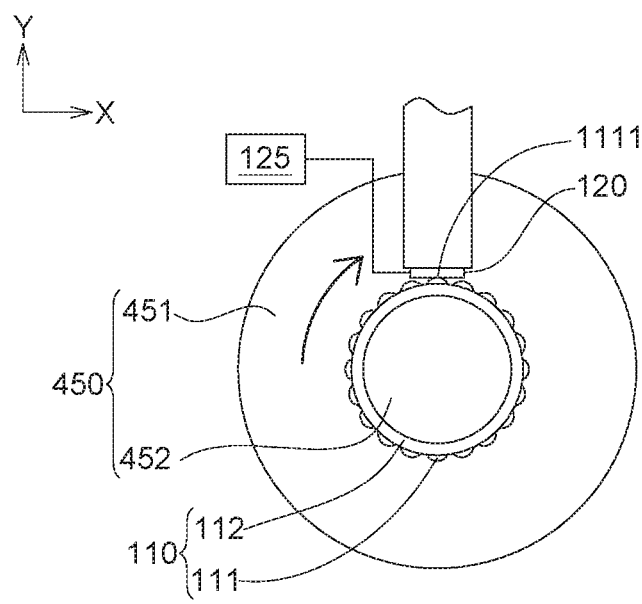
FIGS. 6B and 6C are schematic diagrams showing a measurement system according to another embodiment of the present disclosure.
Figure 6C:
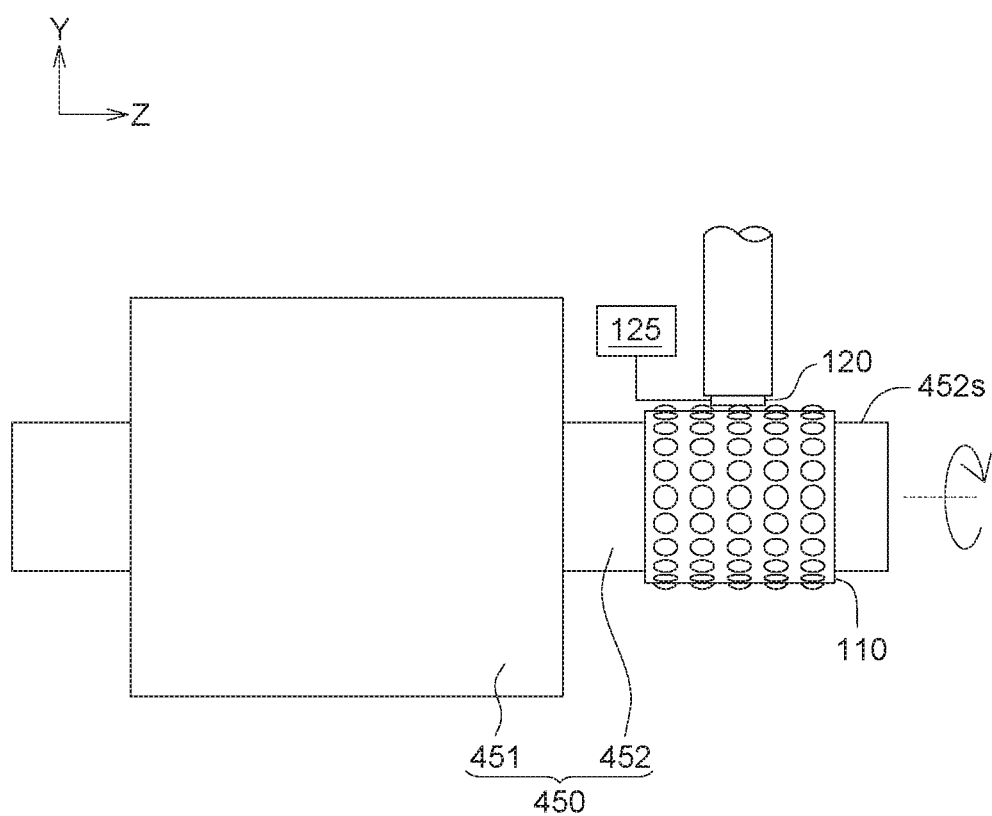

Referring to FIGS. 6A-6C, FIG. 6A is a flow chart of a measurement method according to another embodiment of the present disclosure, and FIGS. 6B and 6C are schematic diagrams showing a measurement system 400 according to another embodiment of the present disclosure.

In step S410, the measurement system 400 is provided. The measurement system 400 includes the film 110, at least one sensor 120, the movement information calculator 125 and a driving device 450. The sensor 120 is electrically connected to the movement information calculator 125. The driving device 450 could be a driving device of any machine tool. In addition, the driving device 450 includes a rotating wheel 451 and a rotating shaft 452, wherein the rotating shaft 452 is connected to the rotating wheel 451 to drive the rotating wheel 451 to rotate synchronously. The rotating shaft 452 protrudes with respect to an end surface of the rotating wheel 451 to allow the film 110 to be disposed on an outer peripheral surface 452s of the rotating shaft 452.

Then, in step S420, the film 110 is rotated with the rotating wheel 451. During the rotation, the sensor 120 remains in direct or indirect contact with the film 110 disposed on the rotating shaft 452 and senses the sensing signal E1.

Then, in step S430, the movement information calculator 125 uses the foregoing method (step S130) to obtain the relative movement speed V1 in the relative movement process according to the sensing signal E1. For example, the movement information calculator 125 obtains the actual speed of the rotating wheel 451, that is, the rotational speed, from the sensing signal E1. Since the rotating wheel 451 and the rotating shaft 452 rotate synchronously, the actual rotational speed of the rotating shaft 452 also is equal to the actual rotational speed of the rotating wheel 451.

In another embodiment, the sensor 120 could also be a touch panel. The pressure sensor of the measurement system 100, 200, 300 or 400 of the foregoing embodiment could be replaced by a touch panel, and the sensing signal similar to the sensing signal E1 of FIG. 1D could also be generated.

It will be apparent to those skilled in the art that various modifications and variations could be made to the disclosed embodiments. It is intended that the specification and examples be considered as exemplary only, with a true scope of the disclosure being indicated by the following claims and their equivalents.

What is claimed is:

1. A measurement system, comprising:
   a film having a patterned structure layer;
   a carrier comprising:
      a sensor configured to contact the patterned structure layer and generate a sensing signal during a relative movement process of the sensor and the film; and
      a movement information calculator configured to obtain at least one of a relative movement amount and a relative movement speed in the relative movement process according to the sensing signal;
   wherein the carrier is electrically isolated from the film and selectively contacts the patterned structure layer of the film by the sensor.

2. The measurement system according to claim 1, wherein the carrier is a glove, and the sensor is a pressure sensor and disposed on an outer surface of the glove.

3. The measurement system according to claim 2, further comprises:
   an actuator disposed inside the glove.

4. The measurement system according to claim 3, wherein the sensor is further configured to sense a contact pressure of contacting the patterned structure layer; the measurement system further comprises:
   a controller configured to:
      determine, from a plurality of tactile modes, one tactile mode of the tactile modes that is closest to the relative movement speed and the contact pressure; and
      control the actuator to be actuated according to the tactile mode that is closest to the relative movement speed and the contact pressure.

5. The measurement system according to claim 1, wherein the patterned structure layer comprises two microstructures and there is an interval between the two microstructures; the sensing signal comprises two impulses generated according to the two microstructures; the movement information calculator further configured to:
   obtain the relative movement speed according to a time difference and the interval between the two impulses.

6. The measurement system according to claim 1, wherein the sensor is disposed on a robot arm; the movement information calculator is configured to:
   obtain the relative movement amount of the robot arm moving over the patterned structure layer according to the sensing signal.

7. The measurement system according to claim 1, wherein the sensor is disposed on a rotating wheel; the movement information calculator is configured to:
   obtain the relative movement speed of the rotating wheel according to the sensing signal.

8. The measurement system according to claim 1, wherein the patterned structure layer is arranged in a surface direction, and the relative movement amount and the relative movement speed are generated in a direction parallel to the surface direction.

9. The measurement system according to claim 1, wherein the patterned structure layer is arranged in a surface direction, the relative movement amount and the relative movement speed are generated in a vertical direction, and the vertical direction is substantially perpendicular to the surface direction.

10. The measurement system according to claim 1, wherein the patterned structure layer is arranged in a surface direction, the relative movement amount and the relative movement speed are generated in an oblique direction, the oblique direction is decomposed into a vertical direction and the surface direction, and the vertical direction is substantially perpendicular to the surface direction.

11. A measurement method, comprising:
   providing a measurement system, wherein the measurement system includes a film and a carrier comprising a sensor and a movement information calculator, the film has a patterned structure layer, and the carrier is electrically isolated from the film and configured to selectively contact the patterned structure layer of the film by the sensor;
   contacting, by the sensor, the patterned structure layer and generating, by the sensor, a sensing signal during relative movement process of the sensor and the film; and
   obtaining, by the movement information calculator, at least one of a relative movement amount and a relative movement speed in the relative movement process according to the sensing signal.

12. The measurement method according to claim 11, wherein the carrier is a glove, and the sensor is a pressure sensor and disposed on an outer surface of the carrier.

13. The measurement method according to claim 12, wherein the measurement system further comprises an actuator disposed inside the glove.

14. The measurement method according to claim 13, wherein the measurement system further comprises a controller; the measurement method further comprises:

sensing, by the sensor, a contact pressure of contacting the patterned structure layer during the relative movement process of the sensor and the film;

determining, from a plurality of tactile modes, one tactile mode of the tactile modes that is closest to the relative movement speed and the contact pressure by the controller; and controlling, by the controller, the actuator to be actuated according to the tactile mode that is closest to the relative movement speed and the contact pressure.

15. The measurement method according to claim 11, wherein the patterned structure layer comprises two microstructures and there is an interval between the two microstructures; the sensing signal comprises two impulses generated according to the two microstructures; the measurement method further comprises:

obtaining the relative movement speed according to a time difference and the interval between the two impulses.

16. The measurement method according to claim 11, wherein the sensor is disposed on a robot arm; step of contacting the patterned structure layer by the sensor further comprises:

contacting the patterned structure layer and moving along a driving axial direction over the patterned structure layer by the robot arm;

in step of obtaining at least one of the relative movement amount and the relative movement speed during the relative movement process according to the sensing signal, the movement information calculator obtains the relative movement amount of the robot arm moving along the driving axial direction over the patterned structure layer.

17. The measurement method according to claim 11, wherein the sensor is disposed on a rotating wheel: step of contacting the patterned structure layer by the sensor comprises:

driving the film to rotate with the rotating wheel;

in step of obtaining at least one of the relative movement amount and the relative movement speed during the relative movement process according to the sensing signal, the movement information calculator obtains the relative movement speed of the rotating wheel according to the sensing signal.

18. The measurement method according to claim 11, wherein in step of providing the measurement system, the patterned structure layer is arranged in a surface direction; in step of generating the sensing signal, the relative movement amount and the relative movement speed are generated in a direction parallel to the surface direction.

19. The measurement method according to claim 11, wherein in step of providing the measurement system, the patterned structure layer is arranged in a surface direction; in step of generating the sensing signal, the relative movement amount and the relative movement speed are generated in a vertical direction substantially vertical to the surface direction.

20. The measurement method according to claim 11, wherein in step of providing the measurement system, the patterned structure layer is arranged in a surface direction; in step of generating the sensing signal, the relative movement amount and the relative movement speed are generated in an oblique direction, wherein the oblique direction is decomposed into a vertical direction and the surface direction, and the vertical direction is substantially perpendicular to the surface direction.

* * * * *